(12) United States Patent
Ota et al.

(10) Patent No.: US 11,363,191 B2
(45) Date of Patent: Jun. 14, 2022

(54) GUIDANCE ELECTRONIC DEVICE RELATING TO BLURRING, CONTROL METHOD OF THE SAME, AND STORAGE MEDIUM

(71) Applicant: CANON KABUSHIKI KAISHA, Tokyo (JP)

(72) Inventors: Tomohiro Ota, Tokyo (JP); Ayumi Sato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/174,165

(22) Filed: Feb. 11, 2021

(65) Prior Publication Data

US 2021/0258475 A1 Aug. 19, 2021

(30) Foreign Application Priority Data

Feb. 13, 2020 (JP) ............................. JP2020-022670

(51) Int. Cl.
*H04N 5/232* (2006.01)
*G02B 27/00* (2006.01)

(52) U.S. Cl.
CPC ..... *H04N 5/23222* (2013.01); *G02B 27/0068* (2013.01); *H04N 5/23212* (2013.01); *H04N 5/232939* (2018.08)

(58) Field of Classification Search
CPC ......... H04N 5/232939; H04N 5/23212; H04N 5/23222; H04N 5/23293; H04N 5/23216; G02B 27/0068; G06F 3/0416; G06F 3/0484; G06F 3/0488
USPC ...................... 348/336, 333.02, 346; 359/383
See application file for complete search history.

(56) References Cited

U.S. PATENT DOCUMENTS

| | | | |
|---|---|---|---|
| 2008/0204566 A1* | 8/2008 | Yamazaki | G03B 5/00 348/208.99 |
| 2012/0300112 A1* | 11/2012 | Natsume | H04N 9/04517 348/336 |
| 2015/0264265 A1* | 9/2015 | Iwata | G06T 5/006 348/208.6 |
| 2018/0183994 A1* | 6/2018 | Yoshida | G06F 3/0488 |
| 2021/0042974 A1* | 2/2021 | Park | G06T 11/60 |

FOREIGN PATENT DOCUMENTS

| | | |
|---|---|---|
| JP | 2001-228507 A | 8/2001 |
| JP | 2018-180132 A | 11/2018 |

* cited by examiner

*Primary Examiner* — Xi Wang
(74) *Attorney, Agent, or Firm* — Cowan, Liebowitz & Latman, P.C.

(57) ABSTRACT

An electronic device includes an acquisition unit capable of acquiring an image captured through optical system, wherein a subject image passing through the optical system has characteristic blurring based on a function of spherical aberration of the optical system or a function of an apodization filter of the optical system; and a control unit that performs control to display, together with the captured image, a guidance related to the characteristic blurring.

19 Claims, 12 Drawing Sheets

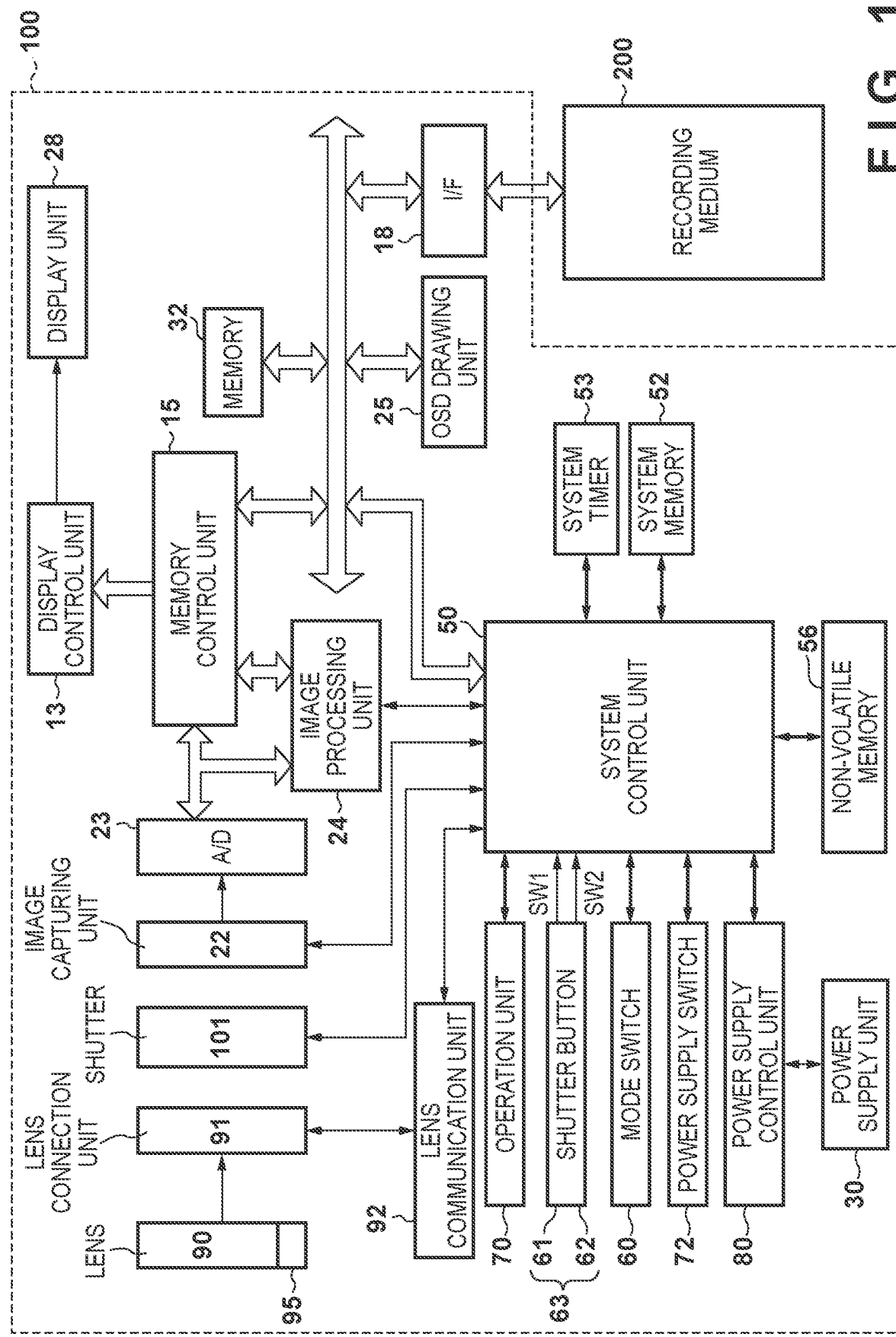

F I G. 2A

| DISPLAY CONDITION | | GUIDANCE EXAMPLES | | |
|---|---|---|---|---|
| | | EFFECT SHOWN | SETTING METHOD/ OPERATION METHOD SHOWN | IMAGE CAPTURE CONTENT SHOWN | POINT TO BE NOTED SHOWN |
| WHEN ABERRATION VARIABLE RING IS OPERATED | (FIRST EMBODIMENT) NO CONDITION | (1.1) SOFT FOCUS EFFECT WAS ADJUSTED | | | |
| | | (1.2) SOFT FOCUS EFFECT WAS WEAKENED | | | |
| | | (1.3) SOFT FOCUS EFFECT WAS ENHANCED | | | |
| | | (1.4) FRONT-FOCUSED SIDE SOFT FOCUS EFFECT WAS ENHANCED | | | |
| | | (1.5) REAR-FOCUSED SIDE SOFT FOCUS EFFECT WAS ENHANCED | | | (1.6) PLEASE CONFIRM EFFECT IN CONTOUR OF SUBJECT OR BLURRED LOCATION |
| | (SECOND EMBODIMENT) UNDER SPECIFIC CONDITION | WHEN SETTING WHOSE EFFECT IS DIFFICULT TO UNDERSTAND | (2.1) PLEASE CONFIRM EFFECT BY WIDENING APERTURE | | |
| | | WHEN IMAGE CAPTURE CONTENT WHOSE EFFECT IS DIFFICULT TO UNDERSTAND | | (2.2) PLEASE CONFIRM WITH SUBJECT HAVING CLEAR CONTOUR | |
| | | | | (2.3) PLEASE CONFIRM WITH STATIONARY SUBJECT | |
| | | WHEN SUBJECT IS UNDER-EXPOSED | | (2.4) PLEASE BRIGHTEN SUBJECT | |
| | | WHEN IN LOW ILLUMINANCE CONDITION | (2.5) SINCE SHOOTING ENVIRONMENT IS DARK, IT IS RECOMMENDED TO TURN OFF SOFT FOCUS WHEN USING AF | | |

FIG. 2B

| DISPLAY CONDITION | GUIDANCE EXAMPLES | | | |
|---|---|---|---|---|
| | EFFECT SHOWN | SETTING METHOD/ OPERATION METHOD SHOWN | IMAGE CAPTURE CONTENT SHOWN | POINT TO BE NOTED SHOWN |
| (THIRD EMBODIMENT) IMMEDIATELY AFTER ABERRATION VARIABLE LENS ACTIVATED IN MOUNTED STATE/ IMMEDIATELY AFTER REPLACEMENT WITH ABERRATION VARIABLE LENS | (3.1) SOFT FOCUS EFFECT IS SET TO +○○ | (3.2) SOFT FOCUS EFFECT CAN BE ADJUSTED BY RING OPERATION | | (3.3) SOFT FOCUS EFFECT IS APPARENT IN CONTOUR OF SUBJECT OR BLURRED LOCATION |
| (FOURTH EMBODIMENT) DURING REPRODUCTION OF STILL IMAGE CAPTURED WHILE SOFT FOCUS EFFECT IS APPLIED | (4.1) SOFT FOCUS EFFECT IS SET TO +○○ | | | (4.2) PLEASE CONFIRM EFFECT IN CONTOUR OF SUBJECT OR BLURRED LOCATION |

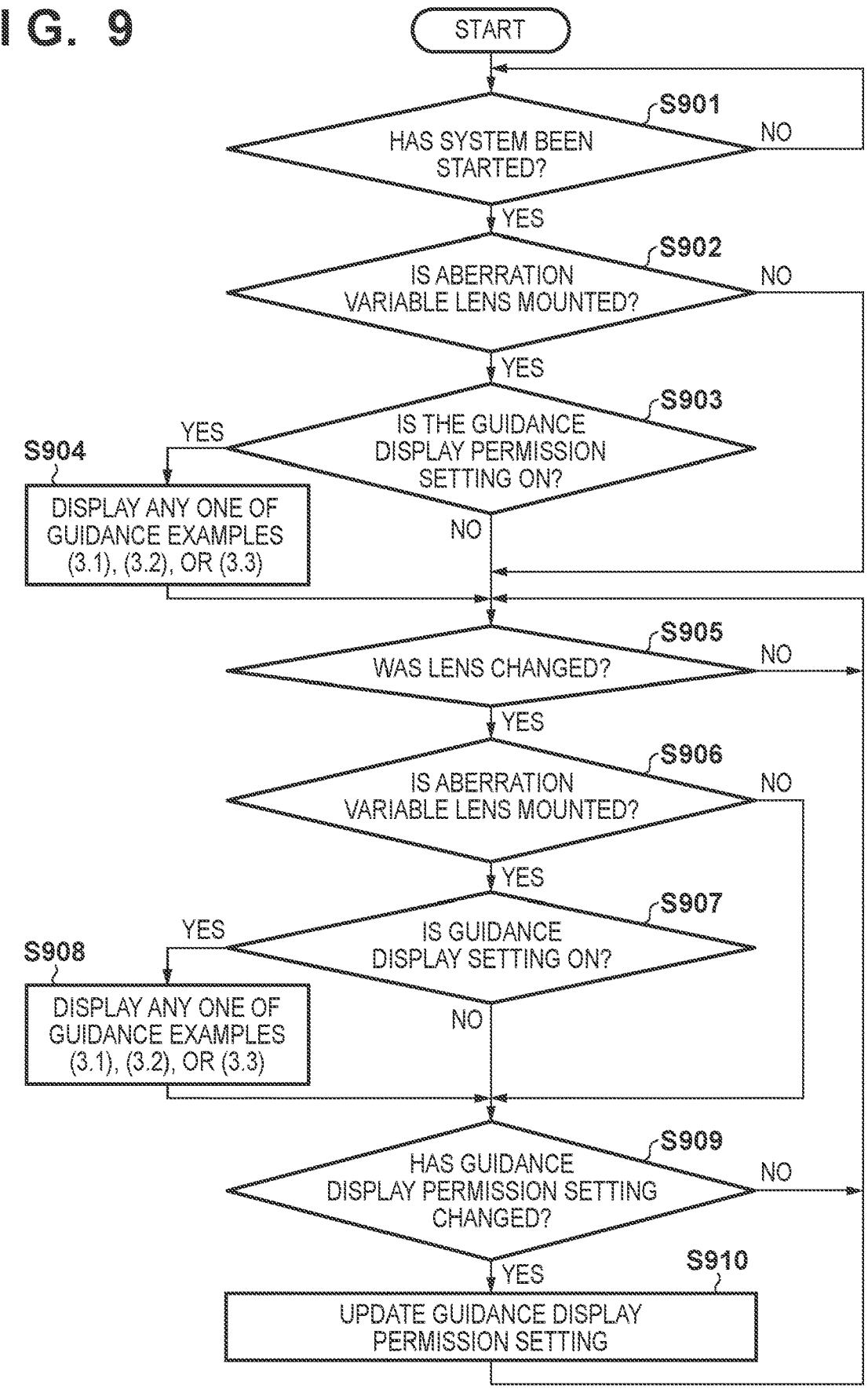

GUIDANCE ELECTRONIC DEVICE RELATING TO BLURRING, CONTROL METHOD OF THE SAME, AND STORAGE MEDIUM

BACKGROUND OF THE INVENTION

Field of the Invention

The present invention relates to an electronic device capable of display control relating to a lens that can adjust the feature of bokeh.

Description of the Related Art

There is a lens that can give an effect to bokeh in a way different from a typical effect given to bokeh by a diaphragm, and can control the magnitude of this effect.

Japanese Patent Laid-Open No. 2018-180132 discloses an imaging optical system having a soft focus function that can adjust spherical aberration without changing the best focus position and the peripheral performance of the screen with respect to the position of an imaging element.

Japanese Patent Laid-Open No. 2001-228507 discloses an optical system and an imaging apparatus in which the effect of an apodization filter can be changed by applying voltage to a liquid in an optical element to change the transmittance.

In Japanese Patent Laid-Open No. 2018-180132 and No. 2001-228507, the effect of blurring can be changed, but the effect may be difficult to notice by just looking, or the effect may not appear clearly depending on the content of the subject and the state of the diaphragm.

Therefore, there is a problem in that it is difficult for the user to notice how the image is affected by the application of the effect and what kind of operation can achieve a larger effect.

SUMMARY OF THE INVENTION

The present invention, which has been made in view of the above problems, provides an electronic device capable of notifying a user of the influence of an operation of a lens or a device on a captured image.

According to a first aspect of the present invention, there is provided an electronic device comprising: at least one processor or circuit configured to function as: an acquisition unit capable of acquiring an image captured through optical system, wherein a subject image passing through the optical system has characteristic blurring based on a function of spherical aberration of the optical system or a function of an apodization filter of the optical system; and a control unit that performs control to display, together with the captured image, a guidance related to the characteristic blurring.

According to a second aspect of the present invention, there is provided a control method of an electronic device comprising: acquiring an image captured through an optical system, wherein a subject image passing through the optical system has characteristic blurring based on a function of spherical aberration of the optical system or a function of an apodization filter of the optical system; and performing control to display, together with the captured image, a guidance related to the characteristic blurring.

Further features of the present invention will become apparent from the following description of exemplary embodiments (with reference to the attached drawings).

BRIEF DESCRIPTION OF THE DRAWINGS

FIG. 1 is a block diagram illustrating a digital video camera according to a first embodiment of the present invention.

FIGS. 2A and 2B are diagrams illustrating conditions of displaying a guidance and guidance examples according to first to fourth embodiments.

FIG. 9 is a flowchart illustrating processing of a digital video camera according to a third embodiment.

DESCRIPTION OF THE EMBODIMENTS

Figure 3:
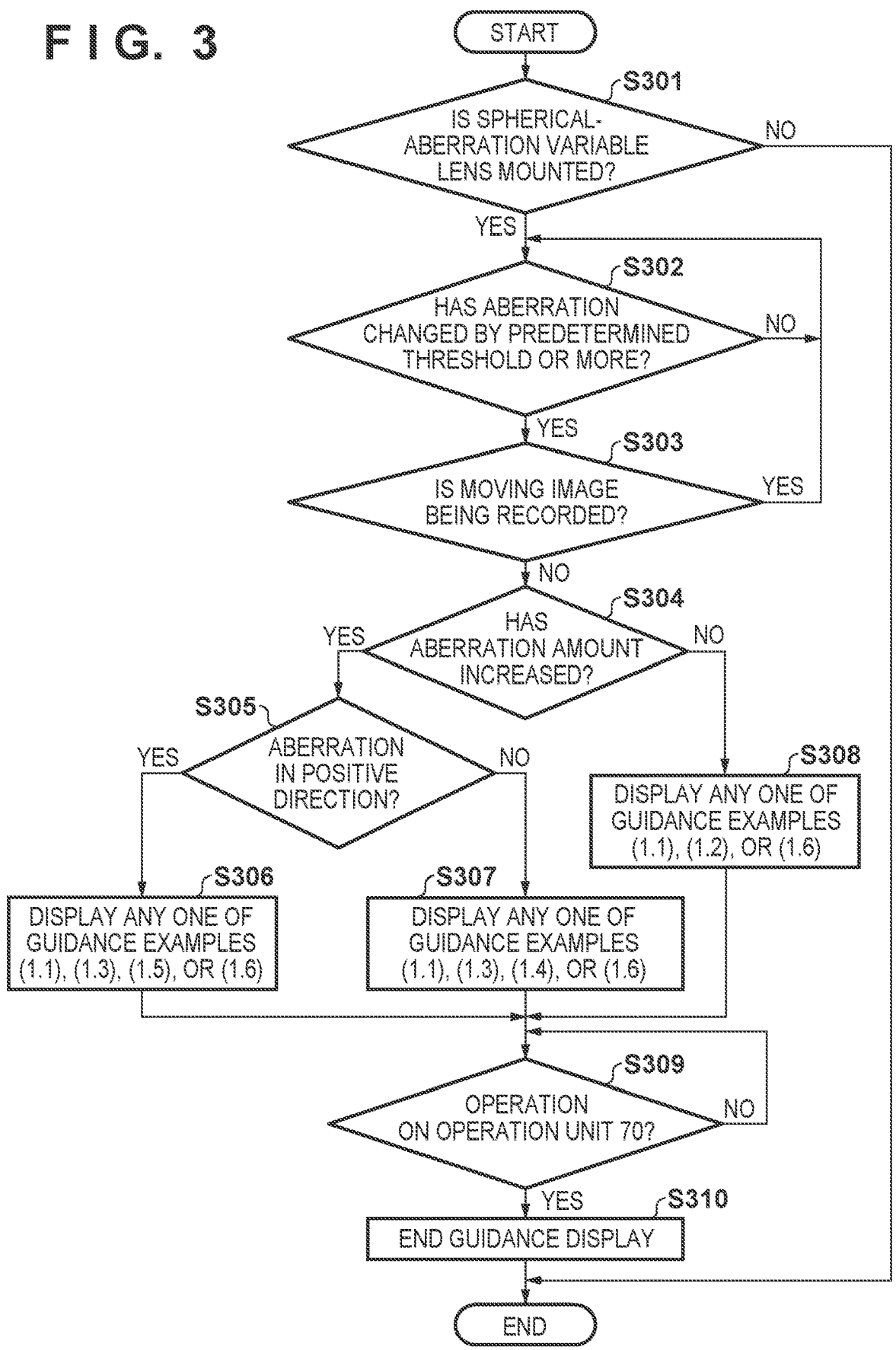
FIG. 3 is a flowchart illustrating the processing of a digital video camera according to the first embodiment.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

First Embodiment

Configuration of Digital Video Camera

FIG. 1 is a block diagram illustrating a configuration example of a digital video camera 100 that is a first embodiment of an electronic device according to the present invention.

In FIG. 1, a shutter 101 is a shutter having a diaphragm function. An image capturing unit 22 can acquire a captured image and includes an image capturing device including a CCD, a CMOS device, or the like for converting an optical image to an electric signal. An A/D converter 23 converts an analog signal output from the image capturing unit 22 to a digital signal.

An image processing unit 24 performs predetermined pixel interpolation, resizing processing such as reduction, color conversion processing, and the like on data from the A/D converter 23 or data from a memory control unit 15. The image processing unit 24 performs predetermined arithmetic processing using the data of the captured image, and a system control unit 50 performs exposure control and focus detection control on the basis of the acquired arithmetic result. In this way, autofocus (AF) processing, automatic exposure (AE) processing, and electronic flash (EF) pre-emission processing in a through-the-lens (TTL) mode are performed. The image processing unit 24 further performs predetermined arithmetic processing using data of the captured image, and performs automatic white balance (AWB) processing in the TTL mode on the basis of the acquired arithmetic result.

The output data from the A/D converter 23 is written directly to a memory 32 via the image processing unit 24 and the memory control unit 15 or via the memory control unit 15. The memory 32 stores image data acquired by the image capturing unit 22 and converted to digital data by the A/D converter 23, and image data for display on a display unit 28. The memory 32 has a storage capacity sufficient to store a predetermined number of still images, and a predetermined temporal length of moving images and sound.

An OSD drawing unit 25 draws an on-screen display image in a graphic VRAM secured in the memory 32, in accordance with an instruction from the system control unit 50. The OSD drawing unit 25 configures a menu screen for performing various settings of the digital video camera 100, an information display screen showing the operation statuses of the components of the digital video camera 100, and a guidance display screen for a user to appropriately operate an operation unit 70 or the like by using font data and icon data stored in a non-volatile memory 56, and draws in a graphic VRAM.

The memory 32 also serves as an image display memory (video memory). A display control unit 13 superimposes and combines the image display data stored in the memory 32 and the data in the graphic VRAM, converts the resulting data into a digital video signal, and supplies the digital video signal to the display unit 28. The display unit 28 provides a display corresponding to the digital video signal from the display control unit 13 on a display, such as an LCD. By sequentially performing this series of processing, the display unit 28 functions as an electronic viewfinder provided with information display and can provide through-image display. In this embodiment, the display unit 28 is, for example, a liquid crystal display. Alternatively, the display unit 28 may be any other type of display, such as an organic electroluminescent (EL) display. The display unit 28 may be integrated with the housing of the digital video camera 100, may be a separate body from the digital video camera 100, or may receive and display a digital video signal sent from the digital video camera 100 via a cable or wireless communication.

The non-volatile memory 56 is an electrically erasable/recordable memory. The non-volatile memory 56 stores constants, programs, etc., for the operation of the system control unit 50. The term "programs" as used herein refers to programs for executing various flowcharts described below in this embodiment.

The system control unit 50 comprehensively controls the digital video camera 100. By executing the programs recorded in the non-volatile memory 56, the processing of this embodiment described below are realized. A RAM is used as a system memory 52. Constants and variables for the operation of the system control unit 50, programs read from the non-volatile memory 56, and the like are loaded in the system memory 52. The system control unit 50 controls the memory 32, the OSD drawing unit 25, the display control unit 13, the display unit 28, etc., to also perform display control. A system timer 53 is a timer unit for measuring the time used for various controls and the time of a built-in clock.

A mode switching switch 60, a first shutter switch 61, a second shutter switch 62, and an operation unit 70 are operating means for inputting various operation instructions to the system control unit 50. The operation members of the operation unit 70 are assigned functions appropriate for each scene by selecting and operating various function icons displayed on the display unit 28, and thereby act as various function buttons. Such function buttons include, for example, a finish button, a return button, an image forward button, a jump button, a narrowing button, an attribute change button, etc. For example, when a menu button is pressed, a menu screen that allows various settable is displayed on the display unit 28. The user can intuitively perform various settings by using the menu screen displayed on the display unit 28, four direction buttons for up, down, left, and right, and a SET button.

The mode switching switch 60 switches the operation mode of the system control unit 50 to one of a still-image recording mode, a moving-image recording mode, a still-image reproducing mode, a moving-image reproducing mode, and the like. As modes included in the still-image recording mode, there are an automatic image capturing mode, an automatic scene discrimination mode, various scene modes that are image capturing settings for different image capturing scenes, a program AE mode, an aperture priority AE mode (hereinafter referred to as AV mode), a shutter-speed priority AE mode (hereinafter referred to as TV mode), a custom mode, a manual mode (hereinafter referred to as M mode), etc. The mode switching switch 60 can directly switch the mode to one of the modes included in the still-image capturing mode. Alternatively, the mode switching switch 60 may temporarily switch the mode to the still-image capturing mode, and then to one of the modes included in the still-image capturing mode by using another operation member. Similarly, the moving-image capturing mode may include multiple modes. The first shutter switch 61 is turned on during operation of a shutter button 63 provided in the digital video camera 100 by so-called half-pressing (image capturing preparation instruction), and generates a first shutter switch signal SW1. The first shutter switch signal SW1 starts operations such as autofocus (AF) processing, automatic exposure (AE) processing, automatic white balance (AWB) processing, and electronic flash (EF) pre-emission processing.

The second shutter switch 62 is turned on when the operation of the shutter button 63 is completed, that is, when the shutter button 63 is fully depressed (image capturing instruction), and generates a second shutter switch signal SW2. In response to the second shutter switch signal SW2, the system control unit 50 starts a series of image capturing operations from reading a signal from the image capturing unit 22 to writing image data to a recording medium 200.

A power supply control unit 80 includes a battery detection circuit, a DC-DC converter, a switch circuit for switching blocks to be energized, etc., and detects whether a battery is installed, the type of battery, and the remaining battery level. The power supply control unit 80 controls the DC-DC converter on the basis of the detection results and the instruction from the system control unit 50, and supplies the necessary voltage to each component including the recording medium 200 for a necessary time period.

A lens connection unit 91 is a lens mounting unit of the digital video camera 100, and includes a lens communication contact, a lens lock mechanism, and a lens mount determined by a standard. A lens (optical system) 90 is a lens mounted on the lens connection unit 91, and includes a mechanism capable of changing spherical aberration, to give a soft focus effect to an optical image. The spherical aberration is aberration that occurs when light emitted from the same point on an optical axis does not converge on one point on the optical axis after passing through the lens. The spherical aberration has an effect of changing the contrast of a focused subject, that is, a soft focus effect, but, at the same time, has a feature of smoothing the contour of a blurred subject image. This is an effect different from the effect of the diaphragm on blurring. For example, when the spherical aberration is increased, a portion of the luminous flux is condensed in front of the focus plane, and as a result, the luminous flux of the background blurring spreads out more. Therefore, even if the aperture diameter is the same, the background blurring becomes enhanced and smooth. In contrast, when the spherical aberration is increased in the opposite direction, the luminous flux of the foreground blurring spreads out, and the foreground blurring becomes enhanced and smooth. It is also possible to form a sharp optical image on the image capturing unit 22 without applying a soft focus effect.

The lens 90 includes multiple rings for respectively changing focus, zoom, aperture, and spherical aberration. In FIG. 1, the ring for changing the spherical aberration is illustrated as a spherical-aberration changing ring 95. The state of the ring and the change amount of the ring operation can be transmitted from the lens 90 to the lens connection unit 91. The type information of the lens 90 can also be transmitted to the lens connection unit 91.

A lens communication unit 92 sends lens control information sent from the system control unit 50 to the lens contact of the lens connection unit 91. At the same time, the lens communication unit 92 sends the lens information sent from the lens contact of the lens connection unit 91 to the system control unit 50. The system control unit 50 can store the received lens information in moving image data or still image data as metadata and store the moving image data or still image data in the recording medium 200.

A power supply unit 30 includes a primary battery, such as an alkaline battery or a lithium battery, a secondary battery, such as a NiCd battery, a NiMH battery, or a Li-ion battery, an AC adapter, and the like. A recording medium I/F 18 is an interface to the recording medium 200, which is a memory card, a hard disk, or the like. The recording medium 200 is a recording medium, such as a memory card for recording captured images, and includes a semiconductor memory, a magnetic disk, or the like.

FIGS. 2A and 2B are diagrams illustrating an example of a guidance display displayed on the display unit 28 when the spherical-aberration changing ring 95 is operated. FIG. 3 is a flowchart illustrating an operation for displaying a guidance display illustrated in FIGS. 2A and 2B. The guidance display for when the spherical-aberration changing ring 95 is operated will be described with reference to FIGS. 2 and 3.

Note that the processing of FIG. 3 is realized by loading a program recorded in the non-volatile memory 56 to the system memory 52 and executing (controllable) the loaded program by the system control unit 50. The processing is started in a state in which the power supply unit 30 is turned on (power-on), and the entire system of the digital video camera 100 is stably activated.

In step S301, the system control unit 50 determines whether or not the lens 90 mounted to the lens connection unit 91 is a lens including a spherical-aberration changing mechanism (spherical-aberration variable lens). If the system control unit 50 determines that the lens is a spherical-aberration variable lens, the processing proceeds to step S302; otherwise, the processing in this flow ends.

In step S302, the system control unit 50 determines whether or not the spherical aberration has been changed by a predetermined threshold or more by the spherical-aberration changing ring 95 provided on the lens 90. By considering the threshold in this step, it is possible to prevent the user from feeling annoyed by a guidance being displayed during every fine adjustment operation. If the system control unit 50 determines that the spherical aberration has been changed to the threshold or more, the processing proceeds to step S303; otherwise, this step is repeated. Here, the term "threshold or more" means that the spherical-aberration changing ring 95 has been turned by a half a rotation or more, or one rotation or more.

In step S303, the system control unit 50 determines whether or not the digital video camera 100 is recording a moving image. By performing the determination in this step, it is possible to prevent the guidance display from covering the display unit 28 during the recording of the moving image, thereby hindering the image capturing operation. If the system control unit 50 determines that a moving image is not being recorded, the processing proceeds to step S304, and if a moving image is being recorded, the processing returns to step S302.

In step S304, the system control unit 50 determines whether or not the aberration amount has increased by a predetermined amount or more as a result of the operation of the spherical-aberration changing ring 95 in step S302. If the system control unit 50 determines that the aberration amount has increased by the predetermined amount or more, the processing proceeds to step S305; otherwise, the processing proceeds to step S308. Here, the term "predetermined amount or more" may refer to, for example, the minimum amount or more of a change in the spherical-aberration changing ring 95 that can be detected by the system control unit 50. Alternatively, the minimum aberration change amount that can be distinguished from an erroneous operation can be determined, and the term "predetermined amount or more" may refer to the minimum aberration change amount or more. In this way, it is possible to avoid display of unnecessary guidance when the user unintentionally touches the spherical-aberration changing ring 95.

In step S305, the system control unit 50 determines whether the aberration has increased in the positive direction or the negative direction. If the system control unit 50 determines that the aberration has increased in the positive direction, the processing proceeds to step S306, and if the aberration has increased in the negative direction, the processing proceeds to step S307.

In step S306, the system control unit 50 causes the display unit 28 to display a guidance display. Specifically, the content of any one of the guidance examples (1.1), (1.3), (1.5), and (1.6) in FIG. 2A is displayed. The guidance to be displayed may be a combination of multiple contents of the guidance examples.

Figure 4A:
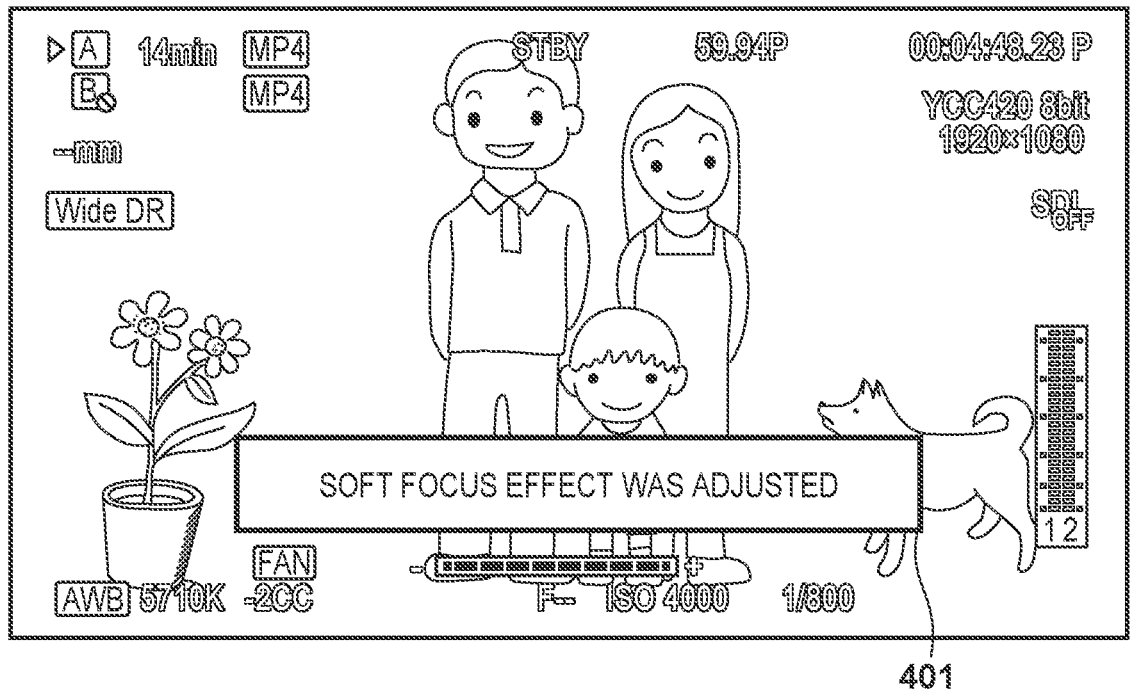
FIGS. 4A and 4B are diagrams illustrating a display unit displaying a guidance.
Figure 4B:
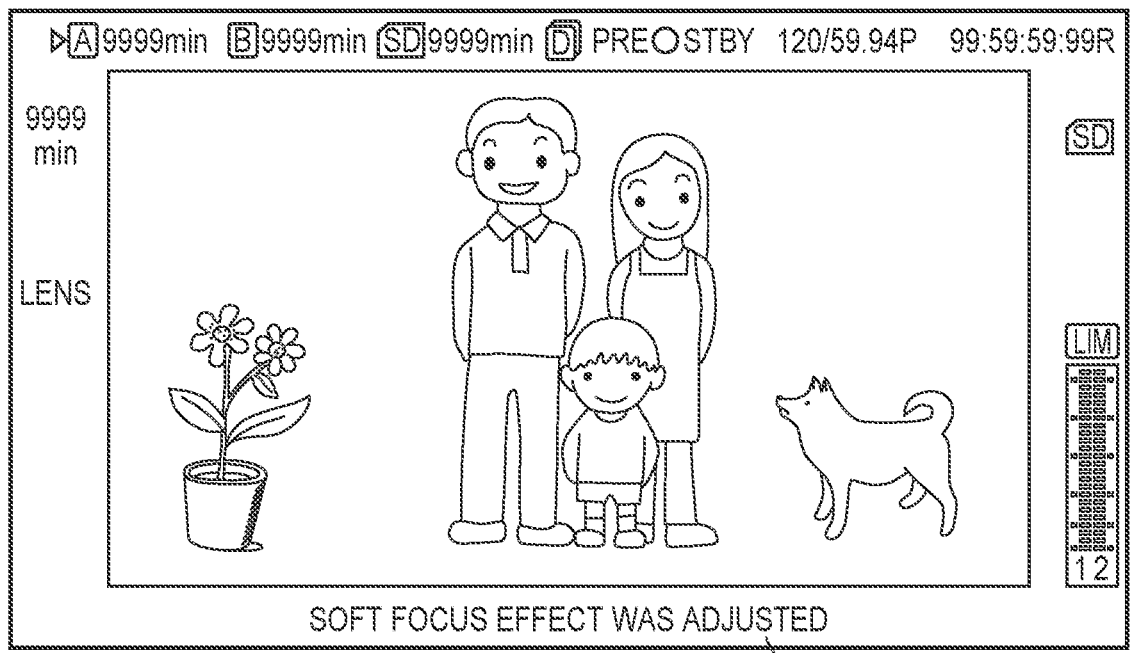

By displaying the guidance example (1.1), it is possible to inform the user that the soft focus effect has been adjusted by the change in spherical aberration and that a change has occurred in the image. The configuration of the screen displayed on the display unit 28 at this time is illustrated in FIGS. 4A and 4B. FIG. 4A illustrates a case in which a guidance is displayed on a live view image, and FIG. 4B illustrates a case in which the live view image is displayed smaller than the entire display range of the display unit 28 and a guidance is displayed in the peripheral area. The same effect is achieved in both cases. Reference numerals 401 and 402 denote guidance displays for displaying the guidance example (1.1). The guidance display described in the following embodiments and steps has the same screen configuration for displaying the respective guidance examples.

By displaying the guidance example (1.3), it is possible to inform the user that the effect of the soft focus has been enhanced by the change in spherical aberration. By displaying the guidance example (1.5), it is possible to inform the user that the effect of the soft focus has been enhanced by the change in spherical aberration, and, in particular, that a desired soft focus effect has been applied to the subject residing in the rear focus direction. By displaying the guidance example (1.6), it is possible to inform the user of which portion of the image should be noted in order to easily recognize the change in the soft focus effect caused by the change in spherical aberration.

In step S307, the system control unit 50 causes the display unit 28 to display a guidance display. Specifically, the content of any one of the guidance examples (1.1), (1.3), (1.4), and (1.6) in FIG. 2A is displayed. The effects of the guidance examples overlapping with those in step S306 are the same as those in step S306. The guidance to be displayed may be a combination of multiple contents of the guidance examples.

By displaying the guidance example (1.4), it is possible to inform the user that the effect of the soft focus has been enhanced by the change in spherical aberration, and, in particular, that a desired soft focus effect is applied to the subject residing in the front focus direction.

In step S308, the system control unit 50 causes the display unit 28 to display a guidance display. Specifically, the content of any one of the guidance examples (1.1), (1.2), and (1.6) in FIG. 2A is displayed. The effects of the guidance examples overlapping with those in steps S306 and S307 are the same as those in steps S306 and S307. The guidance to be displayed may be a combination of multiple contents of the guidance examples.

By displaying the guidance example (1.2), it is possible to inform the user that the effect of the soft focus has been weakened by the change in spherical aberration.

In step S309, the system control unit 50 determines whether or not the operation unit 70 has been operated while a guidance is displayed in steps S306 to S309. If the system control unit 50 determines that the operation unit 70 has been operated, the processing to proceed to step S310; otherwise, this step is repeated.

In step S310, the system control unit 50 ends the guidance display in steps S306 to S309. Alternatively, the system control unit 50 may end the guidance display after the guidance has been displayed for a predetermined time, such as three or five seconds.

According to this embodiment, when the soft focus effect is changed by an operation of the spherical-aberration changing ring 95, the content of the change and the point to be noted for confirming the change can be announced to the user through a guidance display.

Modifications

Modifications of the first embodiment will now be described. In the above embodiment, a case in which the soft focus effect is achieved by operating the spherical-aberration changing ring 95 has been described. However, in the modifications, the case in which an apodization filter is used will be described. When the apodization filter is used, blurring changes as a result of an operation of a diaphragm ring provided in place of the spherical-aberration changing ring 95.

Figure 5:
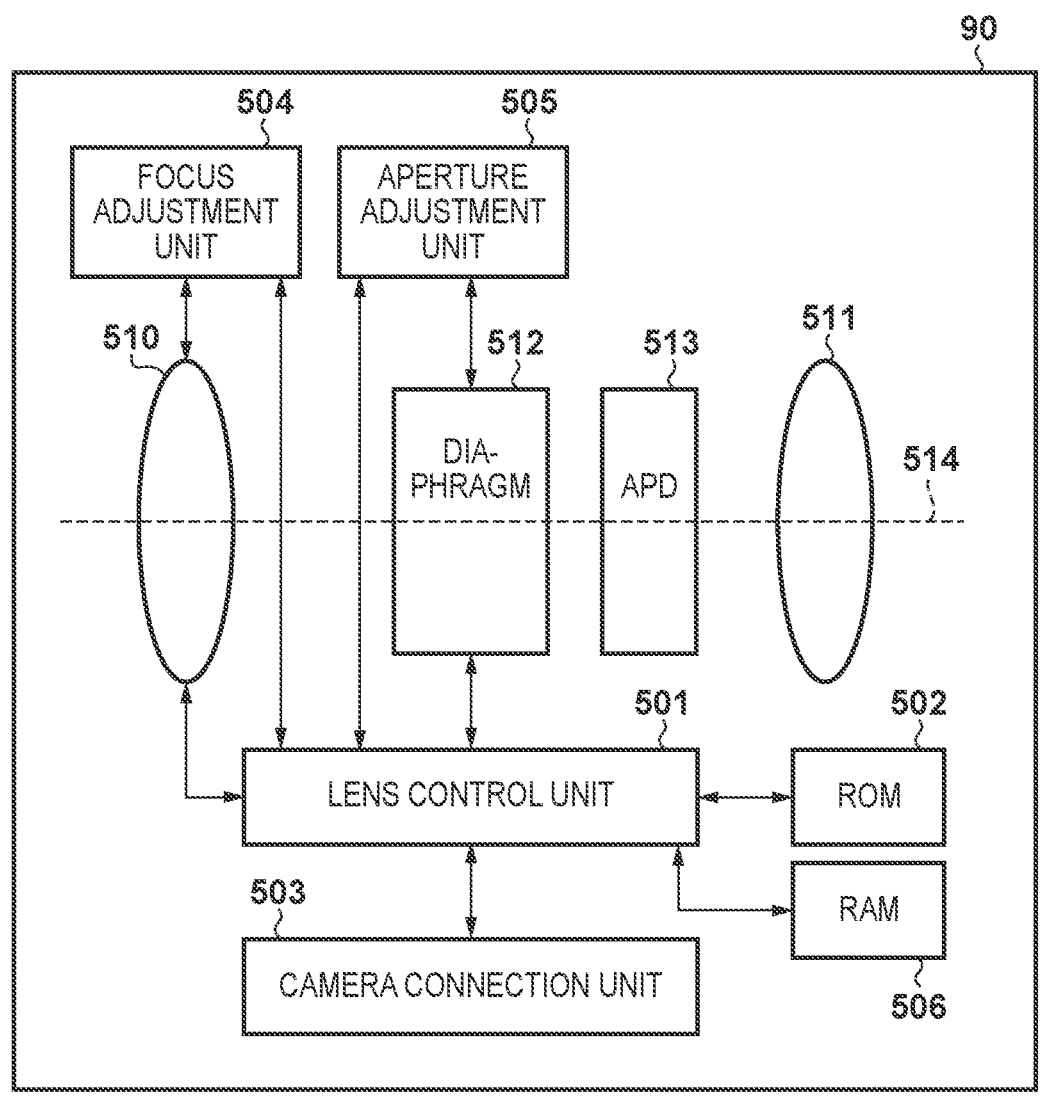
FIG. 5 is block diagram illustrating a functional configuration example of a lens.

FIG. 5 is a block diagram illustrating a functional configuration example of the lens 90 that can be connected to the digital video camera 100. The lens 90 is an image capturing optical system of the digital video camera 100.

The lens control unit 501 is, for example, a CPU, and controls the operation of the components of the lens 90 by loading programs stored in a ROM 502 to a RAM 506 and executing the loaded programs.

A camera connection unit 503 mechanically engages with the lens connection unit 91 of the digital video camera 100 to connect the lens 90 to the digital video camera 100. When the lens 90 is connected to the digital video camera 100, the contact points of the camera connection unit 503 and the lens connection unit 91 come into contact with each other, and the lens 90 and the digital video camera 100 are also electrically connected.

In this way, the lens control unit 501 and the system control unit 50 can communicate with each other, and information on the lens 90 is sent from the lens control unit 501 to the system control unit 50 upon establishment of the connection. The lens control unit 501 controls the operations of a focus adjustment unit 504 and a diaphragm adjustment unit 505 in accordance with a command from the system control unit 50, and sends position information of a focus lens (front lens group 510) and information of the aperture value of a diaphragm 512 to the system control unit 50.

The front lens group 510 and a rear lens group 511 are disposed on an optical axis 514 of the lens 90, and form an optical image of the subject on an imaging surface of the image capturing unit 22. The focus adjustment unit 504 drives the front lens group 510 in the optical axis 514 direction to change the focusing distance of the lens 90. In this way, the degree of focusing of the image formed on the imaging surface changes. The focus adjustment unit 504 is, for example, a motor. The front lens group 510 is disposed closer to the subject than the diaphragm 512, and the rear lens group 511 is disposed closer to the digital video camera 100 than the diaphragm 512. The position information of the front lens group 510 can be detected by a lens control unit 501.

The diaphragm 512 is disposed on the optical axis 514, and the aperture diameter is adjusted by the diaphragm adjustment unit 505. The diaphragm adjustment unit 505 is, for example, an actuator. Note that the diaphragm 512 may be manually operated. In such a case, the diaphragm adjustment unit 505 includes, for example, a diaphragm ring operated by a user and an aperture adjusting mechanism of the diaphragm interlocked with the diaphragm ring. Although the diaphragm adjustment unit 505 adjusts the F number, the diaphragm adjustment unit 505 may adjust the T number.

An APD 513, which is also referred to as an apodization filter or a smooth transfer focus, is an optical member having transmittance that gradually varies in accordance with the distance from the optical axis (center of the luminous flux). Here, the APD 513 is disposed on the optical axis 514 between the diaphragm 512 and the rear lens group 511. The APD 513 may also be regarded as an optical member that modulates the transmittance distribution in the radial direction of a light beam passing through the pupil of the lens 90. The APD 513 may be an optical element composed by forming a film having an optical property of modulating the transmittance distribution in the radial direction of the pupil, on the surface of the optical glass by deposition or the like. Note that, in place of the APD 513, a film having a similar optical property may be formed on a portion of the optical members constituting the front lens group 510 and the rear lens group 511 by deposition or the like. In such a case, the lens corresponds to a configuration serving as the APD. The APD 513 has an effect of realizing a soft blurred image by making the blurred image smoother. Details of this will be described below.

Note that the driving amount and the driving direction of the front lens group 510 may be determined by the lens control unit 501 instead of being instructed from the system control unit 50 to the lens control unit 501. In such a case, information for determining the defocus amount may be supplied from the system control unit 50 to the lens control unit 501. Note that a portion of the front lens group 510 or a portion of the rear lens group 511 may function as a focus lens.

Configuration and Property of Apodization Filter

Figure 6A:
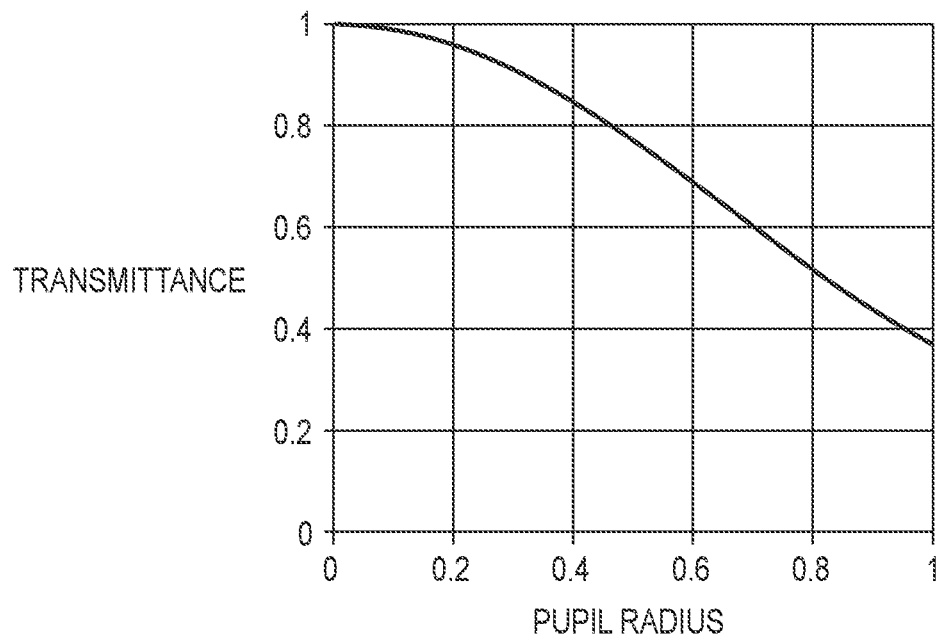
FIGS. 6A and 6B are diagrams illustrating an example of the transmittance properties of an APD in FIG. 5, and a relationship example of the F number and the T number.

The optical property of the APD 513 will now be described. FIG. 6A is a diagram illustrating a relationship example of the normalized pupil radius and the transmittance of the APD 513. The pupil radius is "0" at the intersection of the optical axis and APD 513 and "1" at the maximum pupil radius. A transmittance of "1" represents 100%. That is, FIG. 6A indicates that the APD 513 has an optical property in which the optical transmittance decreases as the distance from the optical axis in the radial direction increases.

The property indicated in FIG. 6A is represented by the following equation (1). In equation (1), t is the transmittance ($0 \leq t \leq 1$), and r is the normalized pupil radius ($0 \leq r \leq 1$).

$$t = \exp(-r^2/r0^2) \quad (1)$$

The F number and the T number have the relationship represented by equation (2).

$$\sqrt{(I0)} \cdot \sqrt{I} = F/T \quad (2)$$

where I0 represents the transmittance of the lens group excluding the APD 513 ($0 < I0 < >1$). The transmittance I0 may be determined by actual measurement or by simulation. I is the light intensity ratio in the absence and presence of the APD 513. The light intensity can be determined, for example, by integrating equation (1). Specifically, I can be expressed by the following equation (3).

$$I = \frac{1 - \exp\left(-\left(\frac{r}{r_0}\right)^2\right)}{\left(\frac{r}{r_0}\right)^2} = \frac{1 - \exp\left(-\left(\frac{F_0}{F}\right)^2\right)}{\left(\frac{F_0}{F}\right)^2} \quad (3)$$

Although, in this example, the light intensity ratio I is analytically determined, for example, the light intensity ratio I may be actually measured for each F number, and the F numbers and the light intensity ratios I may be associated with each other and stored in, for example, a table format in the ROM 502.

Figure 6B:
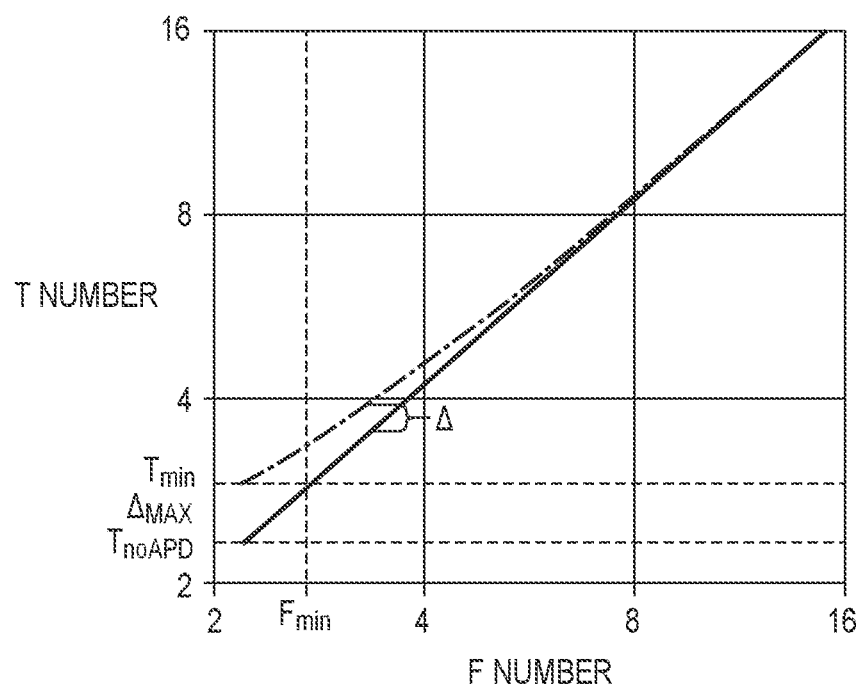

FIG. 6B illustrates an example of the relationship between the F number and the T number when the light intensity ratio I0 is 0.9. The horizontal axis represents the F number, and the vertical axis represents the T numbers. Fmin indicates the minimum F number (maximum aperture) of the lens 90, and is 2.2 in this example. The dashed-dotted line indicates the relationship between the F number and the T number when the APD 513 is disposed on the optical axis 314. The T number changes non-linearly with the change of the F number, particularly in the range in which the F number is small. This is because the influence of the modulation of the transmittance in the radial direction by the APD 513 appears in the T number in the region in which the F number is small. Tmin is the minimum T number corresponding to the minimum F number 2.2 and is determined by equation (2).

The solid line in FIG. 6B indicates the relationship between the F number and the T number in the absence of the APD 513. In the absence of the APD 513, the T number changes linearly with the change in the F number as represented by the following equation (4).

$$\sqrt{(I0)} = F/T' \quad (4)$$

In FIG. 6B, $\Delta$ represents the difference or the deviation amount between the T number obtained by equation (4) and the T number in the presence of the APD 513 with respect to the same F number. Equations (4) and (2) can be used to determined $\Delta$ by the following equation (5).

$$\Delta = F/T' - F/T = \sqrt{(I0)} - F/T \quad (5)$$

In FIGS. 6A and 6B, TnoAPD represents the T number at the minimum F number Fmin in the absence of APD 513. Furthermore, $\Delta$MAX represents the maximum deviation amount between the T numbers for the same F number in the presence and absence of the APD 513, and is represented by the following equation (6).

$$\Delta \text{MAX} = \sqrt{(I0)} - F\min/F\text{noAPD} \quad (6)$$

When the APD 513 has the modulation property of transmittance in which the transmittance t monotonically decreases with an increase of the pupil radius r as represented by equation (1), the T number also monotonically decreases with an increase of the pupil radius r, and $\Delta$ monotonically increases, based on equations (2), (3), and (5). As described above, the blurring (bokeh) of the image in the out-of-focus portion (blurred image) is affected by the difference between the T number and the F number. Since the magnitude of $\Delta$ affects the magnitude of the difference between the T number and the F number, the magnitude of $\Delta$ can also be used as an index of bokeh.

Effect of Apodization Filter

Figure 7A:
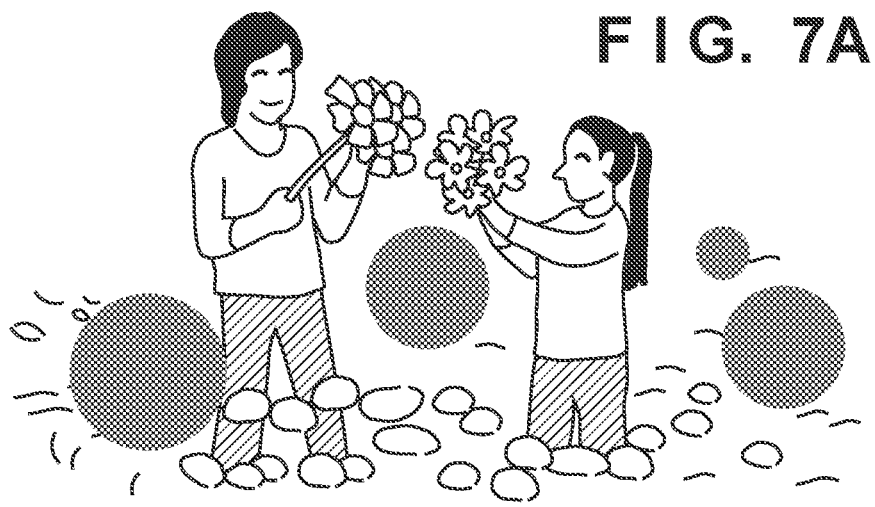
FIGS. 7A to 7C are diagrams schematically illustrating the effect of the APD.
Figure 7B:
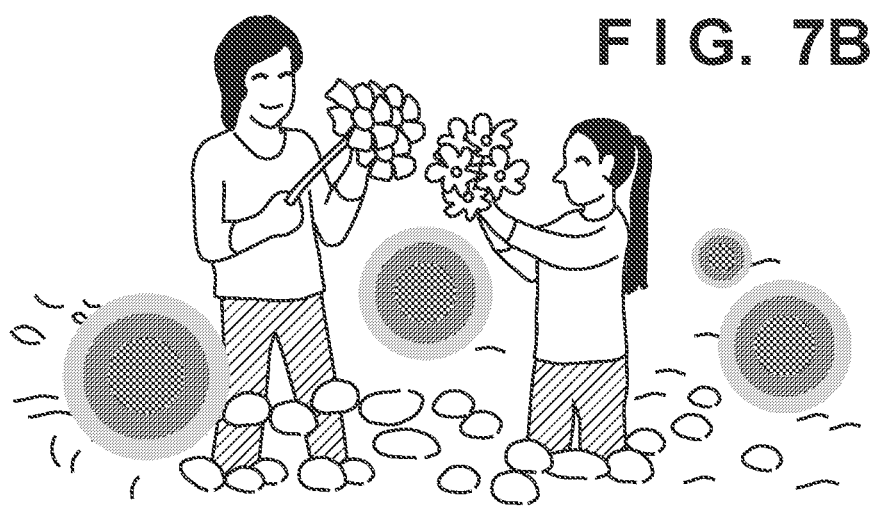
Figure 7C:
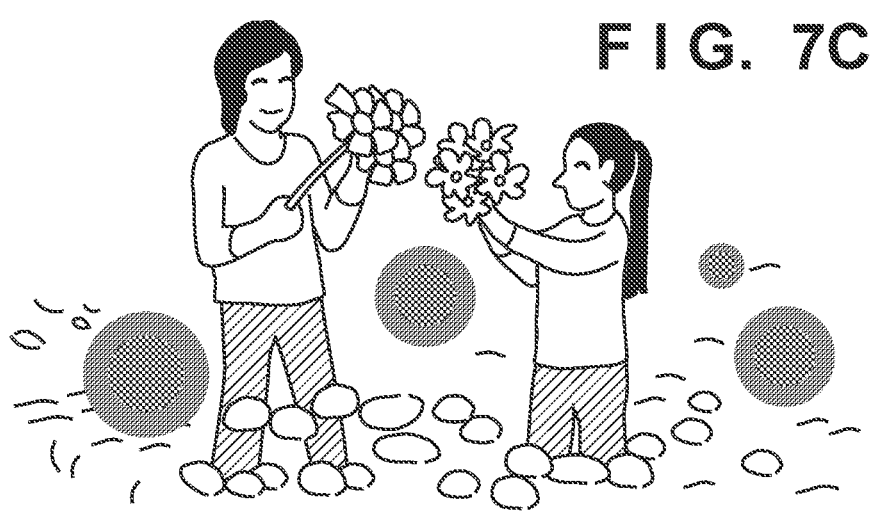

FIGS. 7A to 7C are diagrams schematically illustrating the change of a blurred image, that is, the change in bokeh, by the APD 513. FIGS. 7A to 7C are images of the same scene, each of which includes circular blurred images. Here, it is assumed that FIG. 7A is an image captured in the absence of the APD 513. FIG. 7B is a schematic view of an image captured in the presence of the APD 513 and with the maximum aperture (Fmin), and FIG. 7C is a schematic view of an image captured in the presence of the APD 513 and with an F number smaller than Fmin (smaller aperture).

In the image of FIG. 7B in which the effect of the APD 513 is highest, the inner portions and the contours of the circular blurred images are smoother, and soft blurred images can be obtained. When the F number is increased, the pupil of the image capturing optical system becomes smaller, and the reduction of the light transmittance due to the APD 513 is suppressed. Thus, the contours of the blurred images become clearer.

Also, in this modification, when the soft focus effect is changed by an operation of the diaphragm ring, a guidance similar to that illustrated in FIGS. 2A and 2B is displayed, as described above. In this way, when the soft focus effect is changed, the content of the change and the point to be noted for confirming the change can be announced to the user through a guidance display.

Second Embodiment

In the second embodiment, the configuration of the digital video camera is the same as that of the first embodiment illustrated in FIG. 1. Therefore, the description thereof is omitted.

Figure 8A:
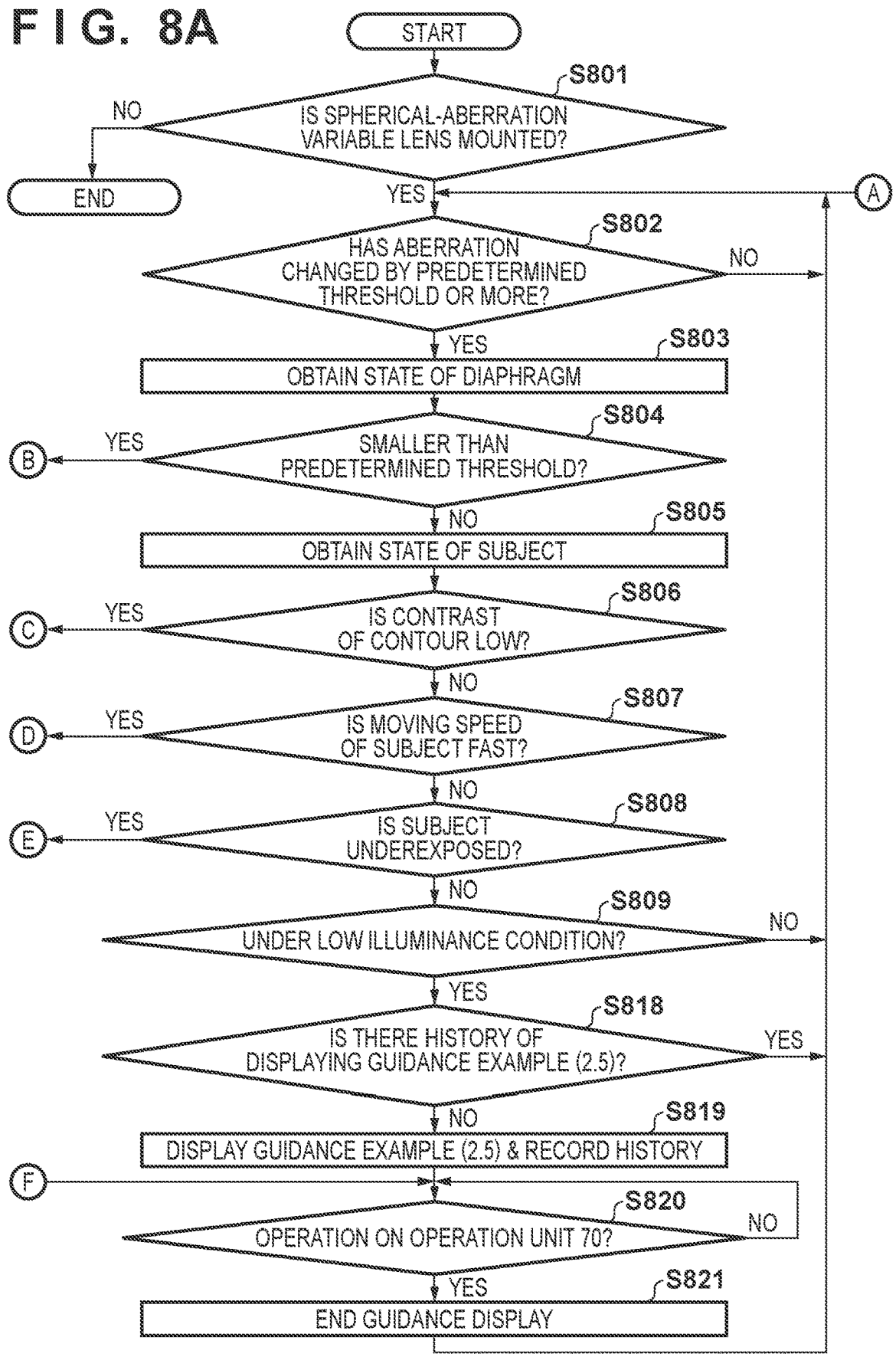
FIGS. 8A and 8B are flowcharts illustrating processing of a digital video camera according to a second embodiment.
Figure 8B:
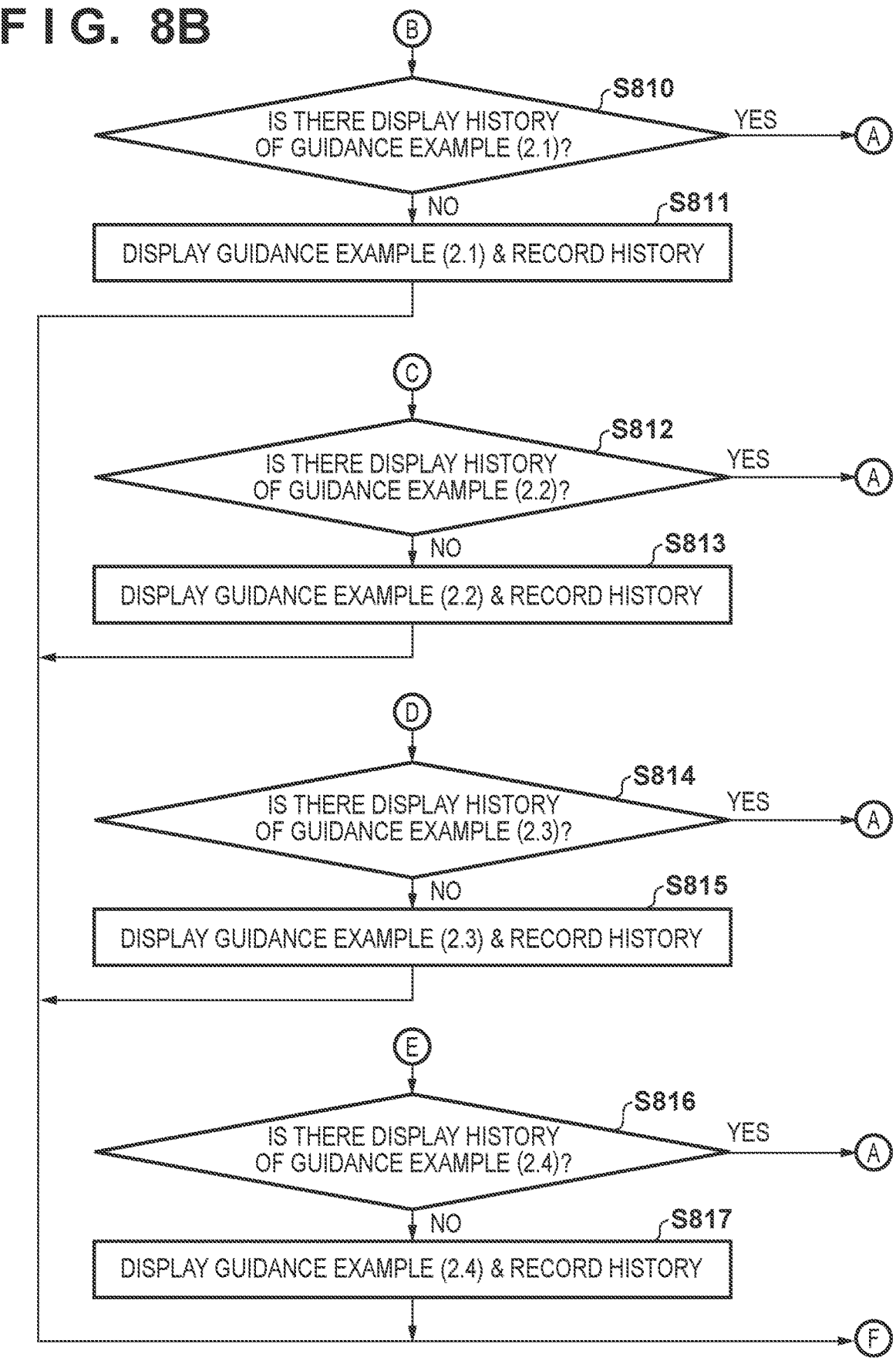

FIGS. 8A and 8B are flowcharts illustrating an operation for a case in which the spherical-aberration changing ring 95 in FIGS. 2A and 2B is operated, and a guidance is displayed under a specific condition.

Note that the processing of FIGS. 8A and 8B is realized by loading a program recorded in the non-volatile memory 56 to the system memory 52 and executing the loaded program by the system control unit 50. This processing is started from a state in which the power supply unit 30 is turned on, and the entire system of the digital video camera 100 is stably activated.

The determination in steps S801 and S802 is the same as the determination in steps S301 and S302 in FIG. 3.

In step S803, the system control unit 50 acquires the state of the diaphragm of the lens 90.

In step S804, the system control unit 50 determines whether or not the aperture value acquired in step S803 is smaller than a predetermined threshold. If the system control unit 50 determines that the aperture is smaller than the predetermined threshold, the processing proceeds to step S810; otherwise, the processing proceeds to step S805. Here, the predetermined threshold is, for example, determined on the basis of whether or not the change in an image by an operation of the spherical-aberration changing ring 95 can be sufficiently perceived.

In step S805, the system control unit 50 determines the state of the subject captured by the image capturing unit 22 using the image processing unit 24, and acquires the characteristics described below in steps S806 to S809. The system control unit 50 uses the characteristics acquired in this step in steps S806, S807, S808, and S809 described below.

In step S806, the system control unit 50 determines whether or not the contour of the subject and the background have a low contrast in which the colors and brightnesses are similar. If the system control unit 50 determines that the contrast is low, the processing proceeds to step S812; otherwise, the processing proceeds to step S807.

In step S807, the system control unit 50 determines whether or not the moving speed of the subject relative to the composition of the captured image is high. If the system control unit 50 determines that the relative moving speed is high, the processing proceeds to step S814; otherwise, the processing proceeds to step S808. Here, the relative movement speed corresponds to, for example, moving a length equal to or greater than half of the angle of view of the captured image in the lateral direction in two seconds, or moving a length equal to or greater than the angle of view of the captured image in the longitudinal direction in one second.

In step S808, the system control unit 50 determines whether or not the subject is underexposed. If the system control unit 50 determines that the subject is underexposed, the processing proceeds to step S816; otherwise, the processing proceeds to step S809.

In step S809, the system control unit 50 determines whether or not the image capturing environment of the subject is under a low illuminance condition. If the system control unit 50 determines that the image capturing environment is under a low illuminance condition, the processing proceeds to step S819; otherwise, the processing returns to step S802. The determination of the low illuminance condition is "YES" when the brightness does not allow sufficient AF performance to be exhibited at maximum spherical aberration achieved by the spherical-aberration changing ring 95.

In step S810, the system control unit 50 determines whether or not the history of displaying the guidance example (2.1) of FIG. 2A has been recorded in the system memory 52. If the system control unit 50 determines that the history has been recorded, the processing returns to step S802; otherwise, the processing proceeds to step S811.

In step S811, the system control unit 50 displays a guidance on the display unit 28. Specifically, the content of the guidance example (2.1) of FIG. 2A is displayed. This display can make the user be aware that the soft focus effect is reduced because the aperture is narrowed, and prompt the user to perform an operation of widening the aperture to enhance the effect. Furthermore, in this step, the system control unit 50 records the display history of the guidance example (2.1) in the system memory 52.

In step S812, the system control unit 50 determines whether or not the history of displaying the guidance example (2.2) of FIG. 2A has been recorded in the system memory 52. If the system control unit 50 determines that the history has been recorded, the processing returns to step S802; otherwise, the processing proceeds to step S813.

In step S813, the system control unit 50 displays a guidance on the display unit 28. Specifically, the content of the guidance example (2.2) of FIG. 2A is displayed. This display can make the user be aware that the soft focus effect is reduced because the contrast of the subject is low, and can prompt the user to perform an operation of changing the subject and/or background to enhance the effect. Furthermore, in this step, the system control unit 50 records the display history of the guidance example (2.2) in the system memory 52.

In step S814, the system control unit 50 determines whether or not the history of displaying the guidance example (2.3) of FIG. 2A has been recorded in the system memory 52. If the system control unit 50 determines that the history has been recorded, the processing returns to step S802; otherwise, the processing proceeds to step S815.

In step S815, the system control unit 50 displays a guidance on the display unit 28. Specifically, the content of the guidance example (2.3) of FIG. 2A is displayed. This display can make the user be aware that the soft focus effect is less prominent because the movement of the subject is fast, and prompt the user to perform an operation of capturing an image of the stationary subject to enhance the effect. Furthermore, in this step, the system control unit 50 records the display history of the guidance example (2.3) in the system memory 52.

In step S816, the system control unit 50 determines whether or not the history of displaying the guidance example (2.4) of FIG. 2A has been recorded in the system memory 52. If the system control unit 50 determines that the history has been recorded, the processing returns to step S802; otherwise, the processing proceeds to step S817.

In step S817, the system control unit 50 displays a guidance on the display unit 28. Specifically, the content of the guidance example (2.4) of FIG. 2A is displayed. This display can make the user be aware that the soft focus effect is less prominent because the subject is underexposed and appears dark in the image, and prompt the user to perform an operation of adjusting the exposure to enhance the effect. Furthermore, in this step, the system control unit 50 records the display history of the guidance example (2.4) in the system memory 52.

In step S818, the system control unit 50 determines whether or not the history of displaying the guidance example (2.5) of FIG. 2A has been recorded in the system memory 52. If the system control unit 50 determines that the history has been recorded, the processing returns to step S802; otherwise, the processing proceeds to step S819.

Through the above processing, it is possible to guarantee that each guidance is displayed only once by each of steps S810, S812, S814, S816, and S818. Therefore, it is possible to prevent the user from being annoyed by the repeated display of the same guidance for setting conditions and image capturing conditions which have already been accepted by the user.

In step S819, the system control unit 50 displays a guidance on the display unit 28. Specifically, the content of the guidance example (2.5) of FIG. 2A is displayed. This display makes the user be aware that the image capturing environment is low in illuminance, and the AF is not readily effective, and prompt the user to perform an operation of turning off the soft focus effect to cause the AF to function. In a state in which spherical aberration is generated, bleeding occurs in the contour of the subject. Therefore, the AF may be poorly effective particularly in a low illuminance environment. The guidance is effective in making the user be aware of the situation and prompting the user to perform an appropriate action. Furthermore, in this step, the system control unit 50 records the display history of the guidance example (2.5) in the system memory 52.

In step S820, the system control unit 50 determines whether or not the operation unit 70 has been operated while a guidance is displayed in steps S811 to S819. If the system control unit 50 determines that the operation unit 70 has been operated, the processing proceeds to step S821; otherwise, this step is repeated.

In step S821, the system control unit 50 ends the guidance display by steps S811 to S819. The system control unit 50 then causes the processing to return to step S802. Note that the guidance may be ended after a predetermined period of time, such as three or five seconds from the start of display.

According to this embodiment, when the change in the soft focus effect is small even after the operation of spherical-aberration changing ring 95 or the function or performance other than the soft focus effect is affected, the guidance display can make the user aware of the state. Since it is also possible to inform the user of a countermeasure, the user can recognize what to do to change the effect.

Third Embodiment

In the third embodiment, the configuration of the digital video camera is the same as that of the first embodiment illustrated in FIG. 1. Therefore, the description thereof is omitted.

FIG. 9 is a flowchart illustrating the operation for a case in which a guidance is displayed immediately after an aberration variable lens has been activated in a mounted state or immediately after the lens has been replaced with an aberration variable lens, as in FIGS. 2A and 2B.

Note that the processing of FIG. 9 is realized by loading a program recorded in the non-volatile memory 56 to the system memory 52 and executing the loaded program by the system control unit 50. The processing starts from a state in which the power of the power supply unit 30 is turned off.

In step S901, the system control unit 50 determines whether or not the power supply unit 30 is turned on and the entire system of the digital video camera 100 is activated. If it is determined that the system control unit 50 is activated, the processing proceeds to step S902.

In step S902, the system control unit 50 determines whether or not the mounted lens 90 is a spherical-aberration variable lens. If the system control unit 50 determines that the lens is a spherical-aberration variable lens, the processing proceeds to step S903; otherwise, the processing proceeds to step S905.

In step S903, the system control unit 50 reads a guidance display permission setting from the non-volatile memory 56, and determines whether or not the setting is turned on. If the system control unit 50 determines that the setting is turned on, the processing proceeds to step S904; otherwise, the processing proceeds to step S905.

In step S904, the system control unit 50 displays a guidance on the display unit 28. Specifically, the content of any one of the guidance examples (3.1), (3.2), and (3.3) in FIG. 2B is displayed. The guidance to be displayed may be a combination of multiple contents of the guidance examples.

By displaying the guidance example (3.1), it is possible to present the spherical aberration setting state of the lens 90 to the user and inform the user that the soft focus effect is effective. By displaying the guidance example (3.2), it is possible to inform the user that the soft focus effect can be changed by the ring operation of the lens 90, and prompt the user to change the setting. By displaying the guidance example (3.3), it is possible to inform the user of which portion of the image should be noted in order to easily recognize the change in the soft focus effect caused by the spherical aberration of the lens 90.

In step S905, the system control unit 50 determines whether or not the lens 90 has been replaced with another lens. If the system control unit 50 determines that the lens 90 has been replaced, the processing proceeds to step S906; otherwise, this step is repeated.

In step S906, the system control unit 50 determines whether or not the lens 90 is replaced with a spherical-aberration variable lens in step S905. If the system control unit 50 determines that the lens is a spherical-aberration variable lens, the processing proceeds to step S907; otherwise, the processing proceeds to step S909.

In step S907, the system control unit 50 reads a guidance display setting from the non-volatile memory 56, and determines whether or not the setting is turned on. If the system control unit 50 determines that the setting is turned on, the processing proceeds to step S908; otherwise, the processing proceeds to step S909.

In step S908, the system control unit 50 displays a guidance on the display unit 28. Specifically, the content of any one of the guidance examples (3.1), (3.2), and (3.3) in FIG. 2B is displayed. The guidance to be displayed may be a combination of multiple contents of the guidance examples. The effects of these guidance examples are the same as those in step S904.

In step S909, the system control unit 50 determines whether or not the operation unit 70 has performed an operation to change the guidance display permission setting. If the system control unit 50 determines that the operation has been performed, the processing proceeds to step S910; otherwise, the processing returns to step S905.

In step S910, the system control unit 50 updates the guidance display permission setting recorded in the non-volatile memory 56 in accordance with the operation result of step S909. If the user requires no guidance as a result of the setting and the determination in steps S903 and S907, the display unit 28 can be operated so as to display no guidance.

According to this embodiment, immediately after the system has been started or immediately after the lens has been replaced with the spherical-aberration variable lens, the user can be informed by the guidance display of the features of the lens, the settings state, and points to be noted for confirming the effect.

Fourth Embodiment

In the fourth embodiment, the configuration of the digital video camera is the same as that of the first embodiment illustrated in FIG. 1. Therefore, the description thereof is omitted.

Figure 10:
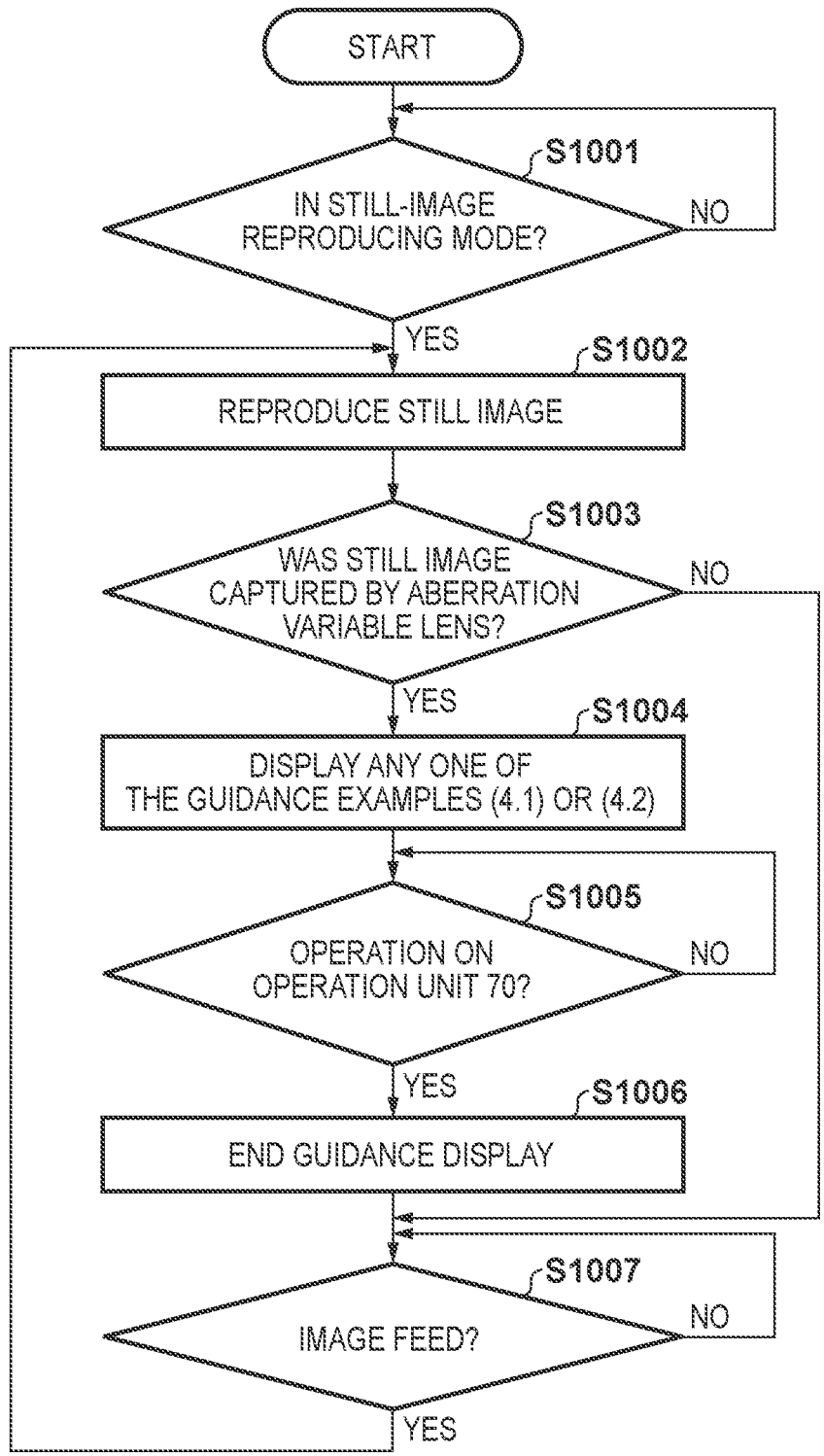
FIG. 10 is a flowchart illustrating processing of a digital video camera according to a fourth embodiment.

FIG. 10 is a flowchart illustrating an operation for a case in which a guidance is displayed during reproduction of a still image captured while the soft focus effect is applied in FIGS. 2A and 2B.

Note that the processing of FIG. 10 is realized by loading a program recorded in the non-volatile memory 56 to the system memory 52 and executing the loaded program by the system control unit 50. This processing is started from a state in which the power supply unit 30 is turned on, and the entire system of the digital video camera 100 is stably activated.

In step S1001, the system control unit 50 determines whether or not the mode has transitioned to a still-image reproduction mode by the mode switching switch 60. If the system control unit 50 determines that the mode has transitioned to a still-image reproduction mode, the processing proceeds to step S1002; otherwise, this step is repeated.

In step S1002, the system control unit 50 reproduces a predetermined still image and displays the reproduced image on the display unit 28. At the same time, the system control unit 50 reads the metadata recorded in the still image data and stores the metadata in the system memory 52. The metadata includes information on the lens that was mounted when the still image was captured.

In step S1003, the system control unit 50 determines, on the basis of the metadata acquired in step S1002, whether or not the still image reproduced in step S1002 is a still image captured with the spherical-aberration variable lens. If the system control unit 50 determines that the still image was captured with the spherical-aberration variable lens, the processing proceeds to step S1004; otherwise, the processing proceeds to step S1007.

In step S1004, the system control unit 50 displays a guidance on the display unit 28. Specifically, the content of any one of the guidance examples (4.1) and (4.2) in FIG. 2B is displayed. The guidance to be displayed may be a combination of contents of both guidance examples.

By displaying the guidance example (4.1), it is possible to present the spherical aberration setting applied to the still image to the user and inform the user that the soft focus effect is effective. By displaying the guidance example (4.2), it is possible to inform the user of which portion of the still image should be noted in order to easily recognize the change in the soft focus effect caused by the spherical aberration.

In step S1005, the system control unit 50 determines whether or not the operation unit 70 has been operated while the guidance is being displayed in step S1004. If the system control unit 50 determines that the operation unit 70 has been operated, the processing proceeds to step S1006; otherwise, this step is repeated.

In step S1006, the system control unit 50 ends the guidance display by step S1004.

In step S1007, the system control unit 50 determines whether or not an image feed operation is performed by the operation unit 70. If the system control unit 50 determines that the image feed operation has been performed, the processing returns to step S1002, and a new still image is then reproduced.

According to this embodiment, the setting state of the spherical aberration and a point to be noted for confirming the effect can be announced to the user by the guidance display while the still image captured with the mounted spherical-aberration variable lens was reproduced.

In the above embodiment, it is assumed that the lens 90 is a lens having a mechanism for changing spherical aberration. However, even if the lens is replaced with a lens using the apodization filter described in the first embodiment, the same effect as in the above-described embodiment can be achieved with respect to the property of smoothing blurring.

Note that the various controls described above as being performed by the system control unit 50 may be performed by one piece of hardware, or the comprehensive control of apparatus may be performed by multiple pieces of hardware sharing the processing.

Although preferred embodiments of the present invention have been described in detail above, the present invention is not limited to these specific embodiments, and various forms that do not depart from the gist of the present invention are also included in the present invention. Furthermore, each of the embodiments described above represents only one embodiment of the present invention, and it is also possible to appropriately combine the embodiments.

In the above embodiments, examples of the present invention being applied to a digital video camera have been described. However, the present invention is not limited to these examples, and may be applied to any electronic apparatus having a display function. That is, the present invention is applicable to a personal computer, a PDA, a mobile phone terminal, a portable image viewer, a printer device having a display, a digital photo frame, a tablet terminal, a smartphone, a projection device, a household electric appliance having a display, an on-vehicle device, and the like.

According to the present invention, it is possible to provide an electronic device capable of notifying a user of the influence of an operation of a lens or a device on a captured image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-022670, filed Feb. 13, 2020 which is hereby incorporated by reference herein in its entirety.

What is claimed is:

1. An electronic device comprising:
   at least one processor or circuit configured to function as:
   an acquisition unit capable of acquiring an image captured through optical system, wherein a subject image passing through the optical system has characteristic blurring based on a function of spherical aberration of the optical system or a function of an apodization filter of the optical system; and
   a control unit that performs control to display, together with the captured image, a guidance related to the characteristic blurring,
   wherein in a case that an adjustment amount of adjusting spherical aberration of the optical system or adjusting function of an apodization filter of the optical system is larger than a threshold, the control unit performs control to display the guidance on the display device.

2. The electronic device according to claim 1, wherein the characteristic blurring has a characteristic in that the blurring changes depending on adjusting spherical aberration of the optical system or adjusting function of an apodization filter of the optical system, regardless of an aperture value of the optical system.

3. The electronic device according to claim 1, wherein in a case that power of the electronic device is turned on while optical system capable of performing adjusting spherical aberration of the optical system or adjusting function of an apodization filter of the optical system is mounted, the control unit performs control to display the guidance on the display device.

4. The electronic device according to claim 1, wherein in a case that the an optical system is replaced with another optical system that is capable of performing adjusting spherical aberration of the other optical system or adjusting function of an apodization filter of the other optical system, the control unit performs control to display the guidance on the display device.

5. The electronic device according to claim 1, wherein in a case that an image captured while adjusting spherical aberration of the optical system or adjusting function of an apodization filter of the optical system is performed, is to be reproduced, the control unit performs control to display the guidance together with the image.

6. The electronic device according to claim 1, wherein in a case that power of the electronic device is turned on, the control unit performs control to display the guidance only once.

7. The electronic device according to claim 1, wherein in a case that a setting for prohibiting a display of the guidance is established, the control unit performs control to not display the guidance.

8. The electronic device according to claim 1, wherein the guidance is a guidance describing the characteristic blurring.

9. The electronic device according to claim 1, wherein the guidance is a guidance describing a point to be noted with respect to the characteristic blurring.

10. The electronic device according to claim 1, wherein the guidance is a guidance describing a setting condition of the electronic device under which the characteristic blurring readily appears.

11. The electronic device according to claim 1, wherein the guidance is a guidance describing an image capturing condition of a subject under which the characteristic blurring is readily appears.

12. An electronic device comprising:
   at least one processor or circuit configured to function as:
   an acquisition unit capable of acquiring an image captured through optical system, wherein a subject image passing through the optical system has characteristic blurring based on a function of spherical aberration of the optical system or a function of an apodization filter of the optical system; and
   a control unit that performs control to display, together with the captured image, a guidance related to the characteristic blurring,
   wherein while a moving image is being recorded, the control unit performs control to not display the guidance.

13. An electronic device comprising:
   at least one processor or circuit configured to function as:
   an acquisition unit capable of acquiring an image captured through optical system,
wherein a subject image passing through the optical system has characteristic blurring based on a function of spherical aberration of the optical system or a function of an apodization filter of the optical system;
and a control unit that performs control to display, together with the captured image, a guidance related to the characteristic blurring,
wherein the guidance is a guidance indicated of an increase in the characteristic blurring in either a positive or a negative direction.

14. A control method of an electronic device comprising:
   acquiring an image captured through an optical system, wherein a subject image passing through the optical system has characteristic blurring based on a function of spherical aberration of the optical system or a function of an apodization filter of the optical system; and
   performing control to display, together with the captured image, a guidance related to the characteristic blurring,
   wherein in a case that an adjustment amount of adjusting spherical aberration of the optical system or adjusting function of an apodization filter of the optical system is larger than a threshold, the control to display the guidance on the display device is performed.

15. A non-transitory computer-readable storage medium storing a program for causing a computer to execute a control method of an electronic apparatus, the method comprising:
   acquiring an image captured through an optical system, wherein a subject image passing through the optical system has characteristic blurring based on a function of spherical aberration of the optical system or a function of an apodization filter of the optical system; and performing control to display, together with the captured image, a guidance related to the characteristic blurring, wherein in a case that an adjustment amount of adjusting spherical aberration of the optical system or adjusting function of an apodization filter of the optical system is larger than a threshold, the control to display the guidance on the display device is performed.

16. A control method of an electronic device comprising:

acquiring an image captured through an optical system, wherein a subject image passing through the optical system has characteristic blurring based on a function of spherical aberration of the optical system or a function of an apodization filter of the optical system; and performing control to display, together with the captured image, a guidance related to the characteristic blurring, wherein while a moving image is being recorded, the control to not display the guidance is performed.

17. A control method of an electronic device comprising:

Acquiring an image captured through an optical system, wherein a subject image passing through the optical system has characteristic blurring based on a function of spherical aberration of the optical system or a function of an apodization filter of the optical system; and performing control to display, together with the captured image, a guidance related to the characteristic blurring, wherein the guidance is a guidance indicated of an increase in the characteristic blurring in either a positive or a negative direction.

18. A non-transitory computer-readable storage medium storing a program for causing a computer to execute a control method of an electronic apparatus, the method comprising:

acquiring an image captured through an optical system, wherein a subject image passing through the optical system has characteristic blurring based on a function of spherical aberration of the optical system or a function of an apodization filter of the optical system; and performing control to display, together with the captured image, a guidance related to the characteristic blurring, wherein while a moving image is being recorded, the control to not display the guidance is performed.

19. A non-transitory computer-readable storage medium storing a program for causing a computer to execute a control method of an electronic apparatus, the method comprising:

acquiring an image captured through an optical system, wherein a subject image passing through the optical system has characteristic blurring base on a function of spherical aberration of the optical system or a function of an anodization filter of the optical system; and performing control to display, together with the captured image, a guidance related to the characteristic blurring, wherein the guidance is a guidance indicated of an increase in the characteristic blurring in either a positive or a negative direction.

* * * * *